United States Patent
Yamamoto

(10) Patent No.: US 8,832,053 B2
(45) Date of Patent: Sep. 9, 2014

(54) RELAY DEVICE, COMMUNICATION SYSTEM AND COMMUNICATION METHOD

(75) Inventor: Hideki Yamamoto, Yokkaichi (JP)

(73) Assignees: Autonetworks Technologies, Ltd., Mie (JP); Sumitomo Wiring Systems, Ltd., Mie (JP); Sumitomo Electric Industries, Ltd., Osaka (JP)

( * ) Notice: Subject to any disclaimer, the term of this patent is extended or adjusted under 35 U.S.C. 154(b) by 403 days.

(21) Appl. No.: 12/811,907

(22) PCT Filed: Mar. 4, 2009

(86) PCT No.: PCT/JP2009/054062
§ 371 (c)(1),
(2), (4) Date: Jul. 7, 2010

(87) PCT Pub. No.: WO2009/110502
PCT Pub. Date: Sep. 11, 2009

(65) Prior Publication Data
US 2010/0281010 A1    Nov. 4, 2010

(30) Foreign Application Priority Data
Mar. 5, 2008 (JP) .................................. 2008-055123

(51) Int. Cl.
G06F 17/30    (2006.01)
H04L 12/46    (2006.01)
H04L 12/40    (2006.01)

(52) U.S. Cl.
CPC ...... H04L 12/40013 (2013.01); H04L 12/4625 (2013.01); *H04L 2012/40273* (2013.01)
USPC .................................. 707/705; 707/E17.044

(58) Field of Classification Search
USPC ........................................................ 707/705
See application file for complete search history.

(56) References Cited

U.S. PATENT DOCUMENTS 5,363,367 A * 11/1994 Kobayashi et al. ........... 370/474
5,887,000 A *  3/1999 Adachi et al. ................. 714/712

(Continued)

FOREIGN PATENT DOCUMENTS

| DE | 10 2007 059 475 A1 | 7/2008 |
| JP | A-2005-159568 | 6/2005 |
| JP | A-2007-336179 | 12/2007 |

(Continued)

OTHER PUBLICATIONS

International Search Report issued in International Application No. PCT/JP2009/054062 on Mar. 31, 2009 (with translation).

(Continued)

*Primary Examiner* — Shyue Jiunn Hwa
(74) *Attorney, Agent, or Firm* — Oliff PLC

(57) ABSTRACT

Provided is a relay device in which when data read from a database is transmitted to external devices, the transmission and reception of the data between the external devices is relayed. Data required by in-vehicle devices must be generated from data. The relay device does not send the data that is calculation source data for generating the data to each of the in-vehicle devices, but generates the data that is a calculation result, stores the data in the database, and sends the data to the in-vehicle devices as required. In addition, the relay device determines whether data needed to be generated is required to be regenerated or not and, only when it is determined that the already stored data is old and regeneration of the data is needed, regenerates the data using the data that is calculation source data.

8 Claims, 9 Drawing Sheets

(56) References Cited

U.S. PATENT DOCUMENTS

2004/0230370 A1 11/2004 Tzamaloukas
2007/0211664 A1* 9/2007 Oyama et al. ............... 370/331
2008/0095063 A1* 4/2008 Nakano ....................... 370/250
2008/0137587 A1* 6/2008 Matsukura et al. .......... 370/315
2008/0147250 A1 6/2008 Oesterling et al.
2009/0313676 A1* 12/2009 Takeshima et al. .......... 725/119

FOREIGN PATENT DOCUMENTS

| JP | A-2008-15651 | 1/2008 |
| JP | A-2008-22158 | 1/2008 |

OTHER PUBLICATIONS

Feb. 6, 2013 Office Action issued in German Patent Application No. 11 2009 000 500.4 (with English Translation).

* cited by examiner

F I G. 8
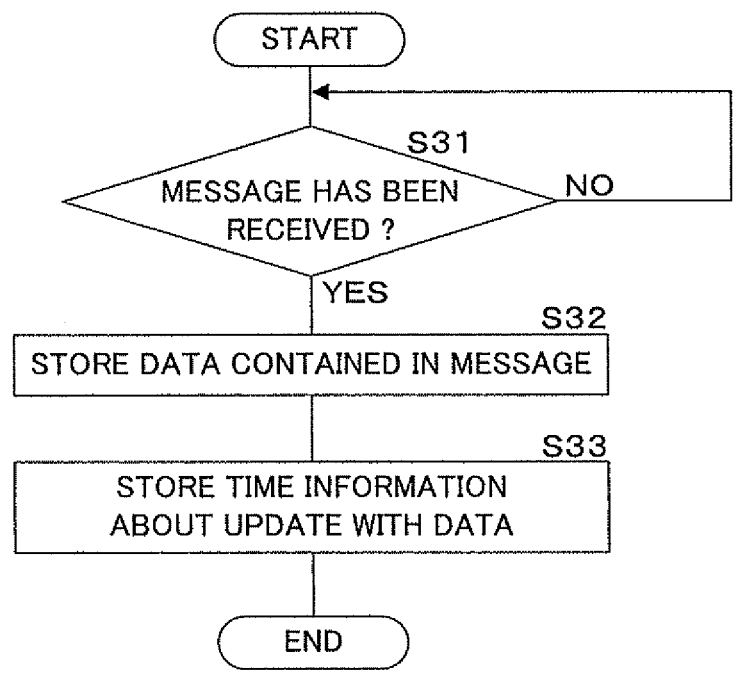

RELAY DEVICE, COMMUNICATION SYSTEM AND COMMUNICATION METHOD

This application is the national phase under 35 U.S.C. §371 of PCT International Application No. PCT/JP2009/054062 which has an International filing date of Mar. 4, 2009 and designated the United States of America.

BACKGROUND

1. Technical Field

The present invention relates to a relay device which generates a database from data received from a plurality of communication devices which send and receive data, and relays data stored in the database to the respective communication devices. The present invention relates more particularly to a relay device capable of reducing the communication load on communication lines and also reducing the computational load on each communication device and the relay device itself, and to a communication system including the relay device, and a communication system.

2. Description of Related Art

In recent years, a system, which connects a plurality of communication devices and causes the communication devices to exchange data and perform various processes in cooperation with each other by assigning functions to the respective communication devices, has been used in a variety of fields. For example, in the field of vehicle-mounted LAN (Local Area Network) provided for vehicles, ECUs (Electronic Control Units) are used as communication devices, and each of the ECUs is arranged to perform a specialized process and exchange data with each other, thereby achieving a system with a variety of functions.

With the specialization of the functions of the respective communication devices and an increase in the number of functions capable of being performed by the respective communication devices, the number and types of communication devices connected to a communication medium also increase. Further, since a variety of functions are expected to be performed by the system, the communication devices need to share data and cooperate with each other, and an amount of data to be transferred is increased.

An increase in the amount of data sent and received through a communication line causes a delay or loss of data due to collisions. A considerable delay or loss of data is a fatal problem for driving assist functions, such as control of brake, performed by the ECUs.

Therefore, it is general to provide a plurality of separate communication lines and connect the ECUs to different communication lines, respectively. By grouping the ECUs which share data, it is possible to reduce wasteful use of the communication lines. Moreover, in order to efficiently use the communication lines for an increase in the types of ECUs, it may be possible to separate the ECUs according to the types of data to be sent and received and connect the ECUs to communication lines of different communication speeds. In these structures, different communication lines are connected with a relay device (gateway device) for controlling the sending and receiving of data.

Japanese Patent Application Laid-Open No. 2005-159568 discloses a technique in which when priority information for identifying the order of priority of data is added to data to be sent and received and a relay device sends and receives data between different communication lines, a priority level is determined from the priority information on the received data and data with a higher priority is sent first so that, even when the communication load on the communication lines is increased, sending of data with a higher priority is not delayed much.

Even when the communication devices are divided into a plurality of groups, if the relay device transfers all the data necessary for controlling the respective communication devices, the amount of data sent to the communication lines is not reduced. Therefore, Japanese Patent Application Laid-Open No. 2008-22158 discloses a technique in which data received from the communication devices are temporarily stored in a database, and data required by each communication device is appropriately retrieved from the database and sent.

SUMMARY

With the advancement in performance of systems, processes performed in the respective communication devices become complex, and the amount of computation is also increased. However, if there is a demand for a decrease in the total weight of a communication system such as, particularly a vehicle-mounted LAN, it is necessary to avoid an increase in the weight of a circuit caused by the complexity of computation performed in each communication device and an increase in the weight of each device.

The present invention has been made to solve the above problems, and it is a principle object of the invention to provide a relay device capable of reducing the amount of data to be sent and decreasing the communication load on communication lines and further reducing the computational load on each communication device by generating necessary data and sending the generated data when relaying data to each communication device, and also capable of reducing the computational load by regenerating data only when the data is old, and to provide a communication system including the relay device, and a communication method.

A relay device according to a first aspect of the invention is a relay device connected to a plurality of external devices through communication lines and including means for receiving data repeatedly sent from the external devices and means for storing the received data in a database, for relaying sending and receiving of data between the external devices by retrieving data from the database and sending the data to the external devices, characterized by comprising: generating means for generating other data by using one or a plurality of data items in the received data; means for storing data generated by the generating means in the database; determining means for determining whether or not regeneration of the generated data stored in the database is necessary; means for regenerating the generated data when the determining means determines that regeneration is necessary; and means for storing the generated data obtained by regeneration in the database.

A relay device according to a second aspect of the invention is characterized by further comprising means for receiving a send request for data from the external device, wherein when the send request is received, if data corresponding to the send request is the generated data, the determining means determines whether or not regeneration of the generated data is necessary.

A relay device according to a third aspect of the invention is characterized in that when one data item is newly received from the external device and contents of the one data item have changed from contents of corresponding past data, the determining means determines that regeneration of data generated using the past data is necessary.

A relay device according to a fourth aspect of the invention is characterized by further comprising means for storing time information when storing data received from the external device in the database and also when the generating means generates data, the time information, the data and the generated data being stored together, wherein the determining means determines, based on the time information stored together with the data and the generated data, whether or not regeneration of the generated data stored in the database is necessary.

A communication system according to a fifth aspect of the invention is a communication system comprising a plurality of communication devices for repeatedly sending and receiving data, and a relay device which is connected to the communication devices through communication lines and relays sending and receiving of data between the communication devices by receiving data from the communication devices, storing the received data in a database, retrieving data corresponding to a send request from each communication device from the database and sending the data, characterized in that the relay device comprises: generating means for generating other data by using one or a plurality of data items in the data received from the communication devices; means for storing data generated by the generating means in the database; means for receiving a send request; determining means for, when data corresponding to a received send request is the generated data, determining whether or not regeneration of the generated data is necessary; means for regenerating the generated data when the determining means determines that regeneration is necessary; means for storing the generated data obtained by regeneration in the database; and means for sending the generated data obtained by regeneration to the communication device.

A communication method according to a sixth aspect of the invention is a communication method for a relay device, which is connected to a plurality of external devices through communication lines and relays sending and receiving of data between the external devices by receiving data repeatedly sent from the external devices, storing the received data in a database, retrieving data from the database and sending the data, the method being characterized by comprising: generating other data by using one or a plurality of data items in the received data; storing the generated data in the database; determining whether or not regeneration of the generated data stored in the database is necessary; regenerating the generated data when it is determined that regeneration is necessary; storing the generated data obtained by regeneration in the database; and sending the generated data to the external device that requires the generated data.

In the first and sixth aspects, data required by an external device (communication device) is generated in the relay device from one or a plurality of data items needed for generating the data stored in the database. Since the data is generated in the relay device and sent to the external device, the amount of data sent from the relay device to the external device is reduced and there is no need to perform the generation process in the external device, as compared to the structure where a plurality of data items to be used as the source data for generating data are sent to an external device and the data is generated in the external device for use in processing. Since the data is generated in the relay device, the computational load on the relay device is increased. However, the data generated and stored in the database is not regenerated unless a determination is made that regeneration is necessary because the data is possibly old as data for use in generation is newly received. Therefore, a wasteful computational process is not performed.

In the second aspect and fifth aspect, when a send request for data generated and stored in the relay device is received, that is, only when the generated data is required, a determination as to whether it is necessary to regenerate the generated data is made, and the data is regenerated only when it is determined that regeneration is necessary. Therefore, a computational process for regenerating the generated data is not wastefully performed.

In the third aspect, when data corresponding to data used for generating the generated data stored in the database is newly received and only when the data has changed, regeneration of the generated data is performed. Thus, the number of times of performing the computational process is reduced, and the generated data is the latest data.

In the fourth aspect, since time information indicating a time at which data to be used as the source data for generating the generated data was updated and time information indicating a time at which the generated data was generated are both stored, it is possible to compare the time information and make a determination that regeneration is necessary when the generated data is certainly old. Thus, the number of times of performing the computational process for generation is reduced, and the generated data is the latest data.

According to the present invention, when relaying the sending and receiving of data between the communication devices (external devices), the relay device enables a reduction in the communication load on the communication lines by reducing the amount of data to be sent to the respective communication devices and also a reduction in the computational load on each communication device because the generation process is performed in the relay device. Further, in the relay device, since data regeneration is performed only when regeneration of the generated data is necessary, the computational load on the relay device itself is also reduced.

The above and further objects and features will more fully be apparent from the following detailed description with accompanying drawings.

BRIEF DESCRIPTION OF DRAWINGS

FIG. 8 is a flowchart illustrating one example of the procedure to be followed when a control section of a relay device of Embodiment 4 receives a message.

DETAILED DESCRIPTION

The following description will explain the present invention in detail with reference to the drawings illustrating some embodiments thereof. In the following embodiments, a communication system according to the present invention is explained by way of an example in which a vehicle-mounted communication system is applied to a vehicle-mounted LAN to which a plurality of ECUs for sending and receiving data are connected.

(Embodiment 1)

Figure 1:
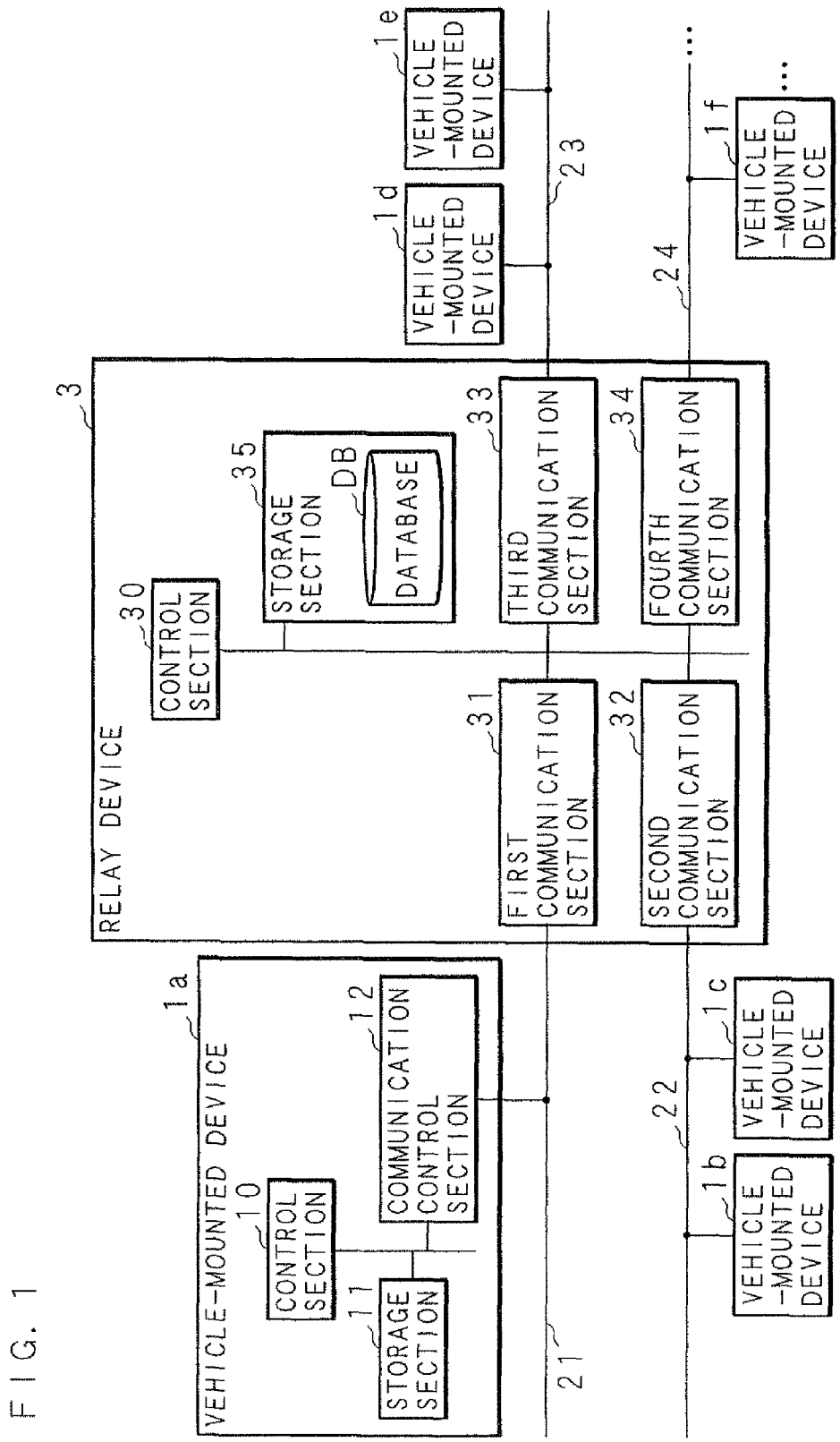
FIG. 1 is a configuration diagram illustrating the configuration of a vehicle-mounted communication system according to Embodiment 1 of the present invention.

FIG. 1 is a configuration diagram illustrating the configuration of a vehicle-mounted communication system according to Embodiment 1 of the present invention. The vehicle-mounted communication system comprises: vehicle-mounted devices 1a, 1b, 1c, 1d, 1e, 1f using electronic control units (ECUs); communication lines 21, 22, 23 and 24 which connect the respective vehicle-mounted devices 1a, 1b, 1c, 1d, 1e, 1f . . . ; and a relay device 3 to which the communication lines 21, 22, 23 and 24 are connected.

The vehicle-mounted device 1a is connected to the communication line 21, the vehicle-mounted devices 1b and 1c are connected to the communication line 22, the vehicle-mounted devices 1d and 1e are connected to the communication lien 23, and the vehicle-mounted device 1f is connected to the communication line 24 by a bus topology. Each of the communication lines 21, 22, 23 and 24 is connected to the relay device 3. The relay device 3 relays data between the communication lines 21, 22, 23, 24 by receiving data from each of the vehicle-mounted devices 1a, 1b, 1c, 1d, 1e, 1f . . . connected to the respective communication lines 21, 22, 23, 24 and sending data to other vehicle-mounted devices 1a, 1b, 1c, 1d, 1e, 1f . . . connected to different communication lines 21, 22, 23, 24.

The vehicle-mounted device 1a has a control section 10 for controlling the operations of components, a storage section 11 for storing data necessary for control, and a communication control section 12 for controlling communication with the communication line 21. Since the internal structures of other vehicle-mounted devices 1b, 1c, 1d, 1e and 1f are the same as that of the vehicle-mounted device 1a, detailed explanations thereof will be omitted.

The control section 10 of the vehicle-mounted device 1a is supplied with power from a power supply device, such as a battery and an alternator in a vehicle, not shown, and controls the operations of the respective components.

The storage section 11 uses a volatile memory, and the control section 10 stores temporarily in the storage section 11 various kinds of information generated during processing, measured values indicated by signals inputted from a sensor as to be described later, or data received from the relay device 3.

The communication control section 12 has a network controller chip and realizes communication with the communication line 21. The control section 10 of the vehicle-mounted device 1a sends and receives data through the communication control section 12.

The vehicle-mounted devices 1a, 1b, 1c, 1d, 1e, 1f . . . thus configured are devices capable of controlling sending of data including numerical information on various physical quantities, such as measured values, calculated values and control values, or capable of controlling an engine, a brake etc., by microcomputers. For example, the vehicle-mounted device 1b functions as an ABS (Antilock Brake System) and is connected to a sensor, not shown, for detecting the rotation speed of a wheel (wheel speed). The vehicle-mounted device 1b controls the brake on the basis of the wheel speed detected through the sensor when the vehicle is driven, and also sends the measured value of the wheel speed as data to the relay device 3 through the communication line 22. More specifically, the data is composed of identifiers (ID) identifying the attributes of data, such as the wheel speed, temperature and angle, and specific numerical information on the respective attributes. The numerical information includes numerical information indicating control values for switching On, Off, Up, Middle, Down, etc.

The communication lines 21, 22, 23 and 24 are communication lines based on the CAN (Controller Area Network) protocol, and the communication control sections 12 of the vehicle-mounted devices 1a, 1b, 1c, 1d, 1e, 1f . . . respectively send and receive data through the communication lines 21, 22, 23, 24 on the basis of the CAN protocols. The communication lines 21, 22, 23 and 24 are not limited to this, and may be able to send and receive data based on protocols of LIN (Local Interconnect Network) and FlexRay (registered trade mark) etc. Further, it is possible to configure the communication lines 21, 22, 23 and 24 by communication lines with different protocols according to the types of data to be sent and received.

The relay device 3 comprises: a control section 30 for controlling the operation of each component; a first communication section 31 (receiving section) connected to the communication line 21; a second communication section 32 (receiving section) connected to the communication line 22; a third communication section 33 (receiving section) connected to the communication line 23; a fourth communication section 34 (receiving section) connected to the communication line 24; and a storage section 35 composed of a volatile memory such as a DRAM (Dynamic Random Access Memory).

The control section 30 uses an FPGA (Field Programmable Gate Array) and is supplied with power from power supply devices, such as the alternator and battery of the vehicle not shown, to control the operations of the respective components. Note that the control section 30 is not limited to the FPGA, and it may be configured using a microcomputer or an ASIC (Application Specific Integrated Circuit).

The first communication section 31 realizes sending and receiving of data to and from the vehicle-mounted device 1a connected through the communication line 21. Similarly, the second communication section 32 realizes sending and receiving of data to and from the vehicle-mounted devices 1b and 1c connected through the communication line 22, the third communication section 33 realizes sending and receiving of data to and from the vehicle-mounted device 1d and 1e connected through the communication line 23, and the fourth communication section 34 realizes sending and receiving of data to and from the vehicle-mounted device 1f connected through the communication line 24.

The storage section 35 has a storage area for a database DB where the control section 30 stores data received from the vehicle-mounted devices 1a, 1b, 1c, 1d, 1e, 1f . . . . The database DB may be provided in a storage device existing outside the relay device 3, connected to the relay device 3, and rewritable. The control section 30 stores in the database DB specific numerical information, such as measured values, calculated values and control values, indicated by the received data for each data attribute, such as "wheel speed" and "steering angle", of the received data. The control section 30 appropriately sends data stored in the database DB to the vehicle-mounted devices 1a, 1b, 1c, 1d, 1e, 1f . . . which require the data.

Moreover, depending on the type of received data, the control section 30 uses the received data as the source data to generate other data and stores the generated data in the database DB. For instance, the control section 30 uses the "wheel speed" and "tire angle" to determine the "steering wheel angle" for assisting driving, and stores it in the database DB. Which data attribute is to be used by the control section 30 for computation to generate other data may be set by hardware, or it is possible to have a configuration in which definitions are stored in a non-volatile memory (not shown) in the control section 30, and the control section 30 performs computation with reference to the definitions in the memory.

Further, the control section 30 has the function of determining whether or not each data item stored in the database DB is old and regeneration is necessary. More specifically, when the control section 30 newly receives data to be the source data for computation, it determines that the numerical information on the data generated using the past data and stored in the database DB is old. When the control section 30 determines that the numerical information on the data is old and regeneration is necessary, it regenerates the data by computation. For example, after the control section 30 determines data for the "steering angle" by using the received data with attribute information "wheel speed" and "tire angle" and stores the data in the database DB, if the control section 30 receives new data on "wheel speed" or "tire angle", it determines that the data on the "steering angle" generated by using the past data on the "wheel speed" or the "tire angle" and stored in the database DB is old and regeneration is necessary. Then, the control section 30 uses the newly received data to regenerate the data on the "steering angle", and stores it again in the database DB.

The control section 30 retrieves data required by the respective vehicle-mounted devices 1a, 1b, 1c, 1d, 1e, 1f . . . from the database DB in the storage section 35, and appropriately relays the data to the vehicle-mounted devices 1a, 1b, 1c, 1d, 1e, 1f . . . , respectively, according to needs.

Note that sending and receiving of data between the relay device 3 and the vehicle-mounted devices 1a, 1b, 1c, 1d, 1e, 1f . . . are executed by sending and receiving a "message" composed of a plurality of data items. Each of the vehicle-mounted devices 1a, 1b, 1c, 1d, 1e, 1f . . . sends a data group acquired by its own operation as a message. When sending data to other vehicle-mounted devices 1a, 1b, 1c, 1d, 1e, 1f . . . which require some data item, a message containing one or a plurality of data items retrieved from the database DB is sent. At this time, only the numerical information on the respective data items is combined, and the control section 10 of the vehicle-mounted devices 1a, 1b, 1c, 1d, 1e, 1f . . . , or the control section 30 of the relay device 3, adds message ID corresponding to the combination of the attribute information to the message and sends the resulting message. The message may contain the ID and the numerical information as a pair.

For example, the vehicle-mounted device 1a creates a message containing the numerical information on "internal temperature" and "external temperature" and sends the message, while the vehicle-mounted device 1b sends a message containing the numerical information on "wheel speed". The relay device 3 recognizes based on the message ID that the numerical information on the "internal temperature", "external temperature" and "wheel speed" is contained, and extracts the respective pieces of information from the messages received from the vehicle-mounted devices 1a and 1b, respectively, and stores them in the database DB. If the vehicle-mounted device 1d requires the "external temperature", the relay device 3 retrieves only the "external temperature" from the database DB in the storage section 35, includes it in a message, and sends the message to the vehicle-mounted device 1d.

Figure 2:
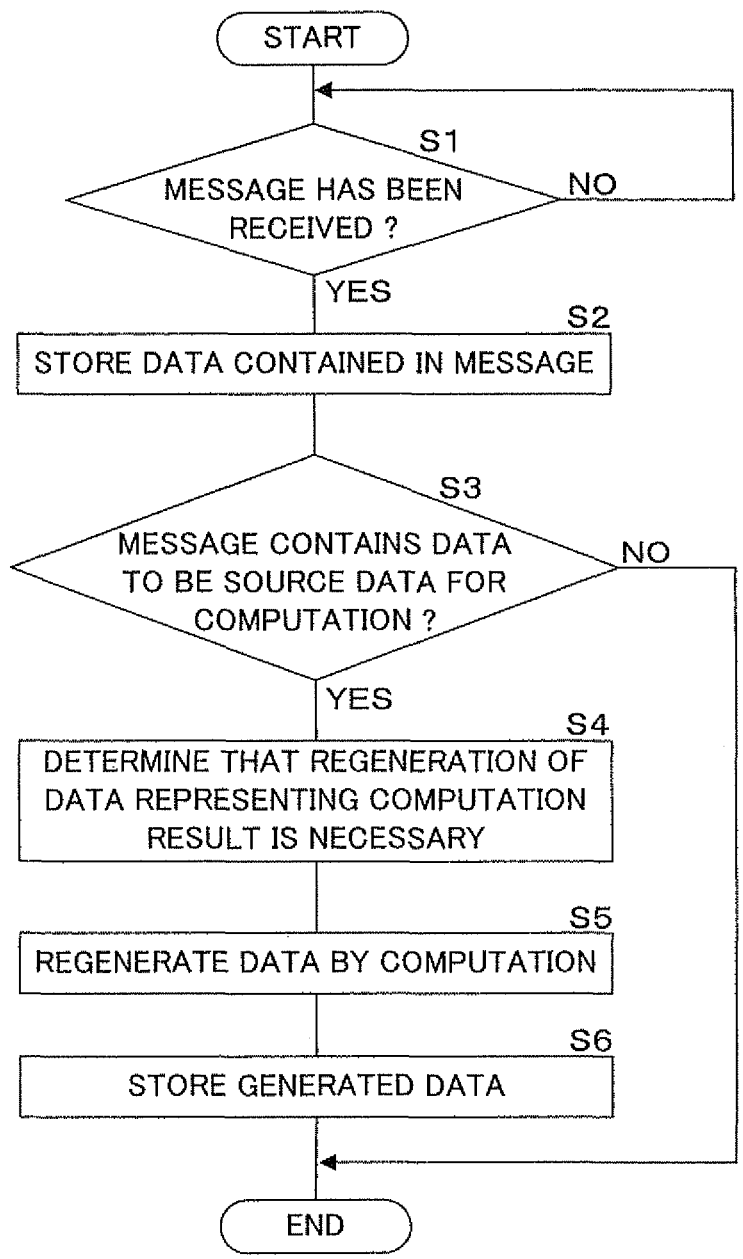
FIG. 2 is a flowchart illustrating one example of the procedure to be followed when a control section of a relay device of Embodiment 1 receives a message.

FIG. 2 is a flowchart illustrating one example of the procedure to be followed when the control section 30 of the relay device 3 of Embodiment 1 receives a message.

The control section 30 determines whether a message has been received from any one of the vehicle-mounted devices 1a, 1b, 1c, 1d, 1e, 1f . . . (step S1). When it is determined that a message has not been received from the vehicle-mounted devices 1a, 1b, 1c, 1d, 1e, 1f . . . (S1: NO), the control section 30 returns the process to step S1. When it is determined that a message has been received from the vehicle-mounted devices 1a, 1b, 1c, 1d, 1e, 1f . . . (S1: YES), the control section 30 extracts data (numerical information) contained in the message and stores the data in the database DB in the storage section 35 (step S2).

Next, the control section 30 determines whether the received message contains data to be the source data for computation (step S3). When it is determined that the received message does not contain data to be the source data for computation (S3: NO), the control section 30 finishes the process which is to be performed when a message is received.

When it is determined that the received message contains data to be the source data for computation (S3: YES), the control section 30 determines that the data representing the computation result generated and stored in the database is old and regeneration is necessary (step S4). Since it is determined that the stored data is old and regeneration is necessary, the control section 30 regenerates the data by computation (step S5), stores the generated data obtained by regeneration in the database DB (step S6), and finishes the process which is to be performed when a message is received.

The control section 30 of the relay device 3 repeats the procedure illustrated in FIG. 2. Every time the relay device 3 receives a message from the vehicle-mounted devices 1a, 1b, 1c, 1d, 1e, 1f . . . , the control section 30 stores the data in the database DB and makes a determination as to whether or not data regeneration is necessary, and regenerates the data if necessary.

Figure 3:
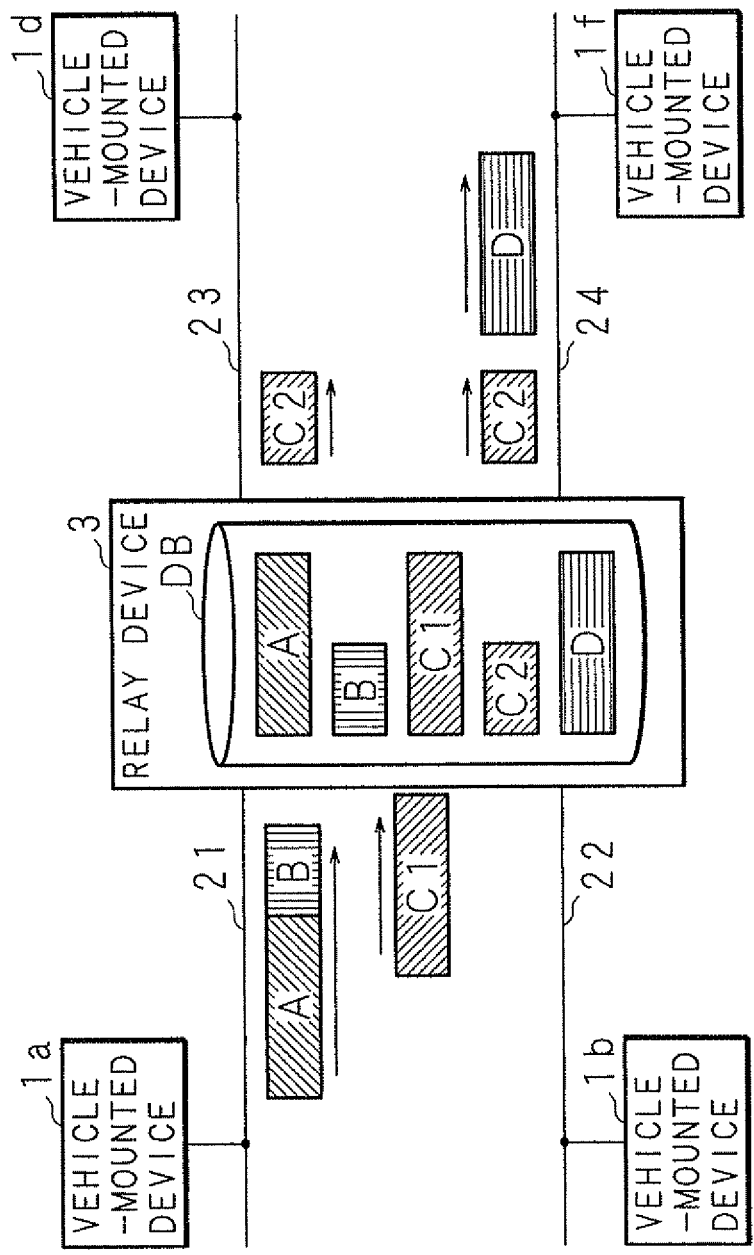
FIG. 3 is an explanatory view illustrating schematically one example of a process executed by the control section of the relay device of Embodiment 1.

FIG. 3 is an explanatory view illustrating schematically one example of a process executed by the control section 30 of the relay device 3 of Embodiment 1. The explanatory view of FIG. 3 illustrates examples of messages sent from the vehicle-mounted device 1a and the vehicle-mounted device 1b, data stored in the database DB of the relay device 3, and messages sent to the vehicle-mounted device 1d and vehicle-mounted device 1f.

As illustrated in the explanatory view of FIG. 3, a message containing data A and data B with the attributes "internal temperature" and "external temperature" is sent from the vehicle-mounted device 1a. When the relay device 3 receives this message, it stores data A and data B retrieved from the message in the database DB. A message containing data C1 with the attribute "wheel speed" is sent from the vehicle-mounted device 1b. When the relay device 3 receives this message, it stores data C1 retrieved from the message in the database DB.

When the relay device 3 receives the message containing data A and data B, the control section 30 stores the data A and data B in the database DB for updates, and determines that the data A and data B are data to be the source data for data D with the attribute "temperature of air jetted out of an air conditioner". The control section 30 determines that the data D stored in the database DB is old and regeneration is necessary, and then regenerates new data D using the data A and data B contained in the received message and stores the resulting data in the database DB. Next, the control section 30 gives the fourth communication section 34 instructions to send the data D representing the computation result, instead of the data A and data B which are the source data for the data D, to the vehicle-mounted device 1f which requires the data D.

When the relay device 3 receives a message containing data C1, the control section 30 stores the data C1 in the database DB for updates. The data C1 has a precision indicated by 16 bits. The control section 30 determines that the data C1 is data to be the source data for data C2. Here, the data C2 is data with the same attribute as data C1, namely "wheel speed", but is data having a precision of 8 bits. Even if vehicle-mounted devices require data with the same attributes, some of them may need data with a high precision, while the other may require data with a low precision. Therefore, the relay device 3 is configured to generate data C2 with low precision from data C1, and stores the data C2 in the database DB. Since the data C1 has been newly received, the control section 30 determines that the data C2 stored in the database DB is old and regeneration is necessary. The control section 30 regenerates the data C2 from the data C1 contained in the received message, and stores the resulting data in the database DB. Next, the control section 30 sends the data C2 representing the computation result, instead of data C1, to the vehicle-mounted device 1d and the vehicle-mounted device 1f which need the data with the attribute "wheel speed" but do not require a high precision.

Hence, the data amounts of the sent data C2 and data D are reduced compared to the case where data to be the source data for computation, namely data A, data B and data C1, are sent respectively to the vehicle-mounted device 1d and the vehicle-mounted device 1f which require data generated by computation. Thus, the communication load on the communication lines 23 and 24 are reduced. Moreover, since there is no need for the vehicle-mounted device 1d and the vehicle-mounted device 1f to perform a computation process, the computational load is reduced.

As another specific example, there is a case where On/Off control of driving of the vehicle-mounted load (actuator) is executed on the basis of the latest information on a plurality of data items stored in the database DB. In this case, if the vehicle-mounted device 1f is a vehicle-mounted device for controlling the driving of the actuator, not all necessary data items are sent to the vehicle-mounted device 1f, but only an On/Off result determined on the basis of these data items is sent to the vehicle-mounted device 1f. Thus, a great reduction in the amount of data sent through the communication line 24 is expected, and the vehicle-mounted device 1f does not need to perform the process of determining On/OFF, thereby eliminating the need of the computation process. The elimination of the need of the computation process allows simplification of the structure of the control circuit of the vehicle-mounted device 1f, and therefore it is possible to achieve a reduction in the size and weight.

The control section 30 does not perform computation every time the relay device 3 sends data generated by computation to the vehicle-mounted devices 1a, 1b, 1c, 1d, 1e, 1f ... which need the data, but, when the relay device 3 receives a message containing data to be the source data for computation, that is, when there is a high possibility that data to be the source data for computation was updated and the already stored data is old, the control section 30 determines that regeneration is necessary and performs calculation. Hence, the control section 30 of the relay device 3 avoids unnecessary computation processes. Further, each data stored in the database DB has the latest contents.

(Embodiment 2)

Regarding a determination as to whether or not it is necessary to regenerate data which is generated by computation using data received from the vehicle-mounted devices 1a, 1b, 1c, 1d, 1e, 1f ..., in Embodiment 1, when a message containing data to be the source data for computation is received from the vehicle-mounted devices 1a, 1b, 1c, 1d, 1e, 1f ..., it is determined that regeneration is necessary. On the other hand, in Embodiment 2, only when data to be the source data for computation is received from the vehicle-mounted devices 1a, 1b, 1c, 1d, 1e, 1f ... and there is a change in the contents of specific numerical information contained in the received data, it is determined that the data is old and regeneration is necessary.

Since the configuration of a vehicle-mounted communication system of Embodiment 2 is the same as that of Embodiment 1 except for the process performed by the control section 30 of the relay device 3, detailed explanations of the respective components will be omitted. The same structures as in Embodiment 1 will be designated with the same reference numerals, and the process performed by the control section 30 of the relay device 3 of Embodiment 2 will be explained in detail below.

Figure 4:
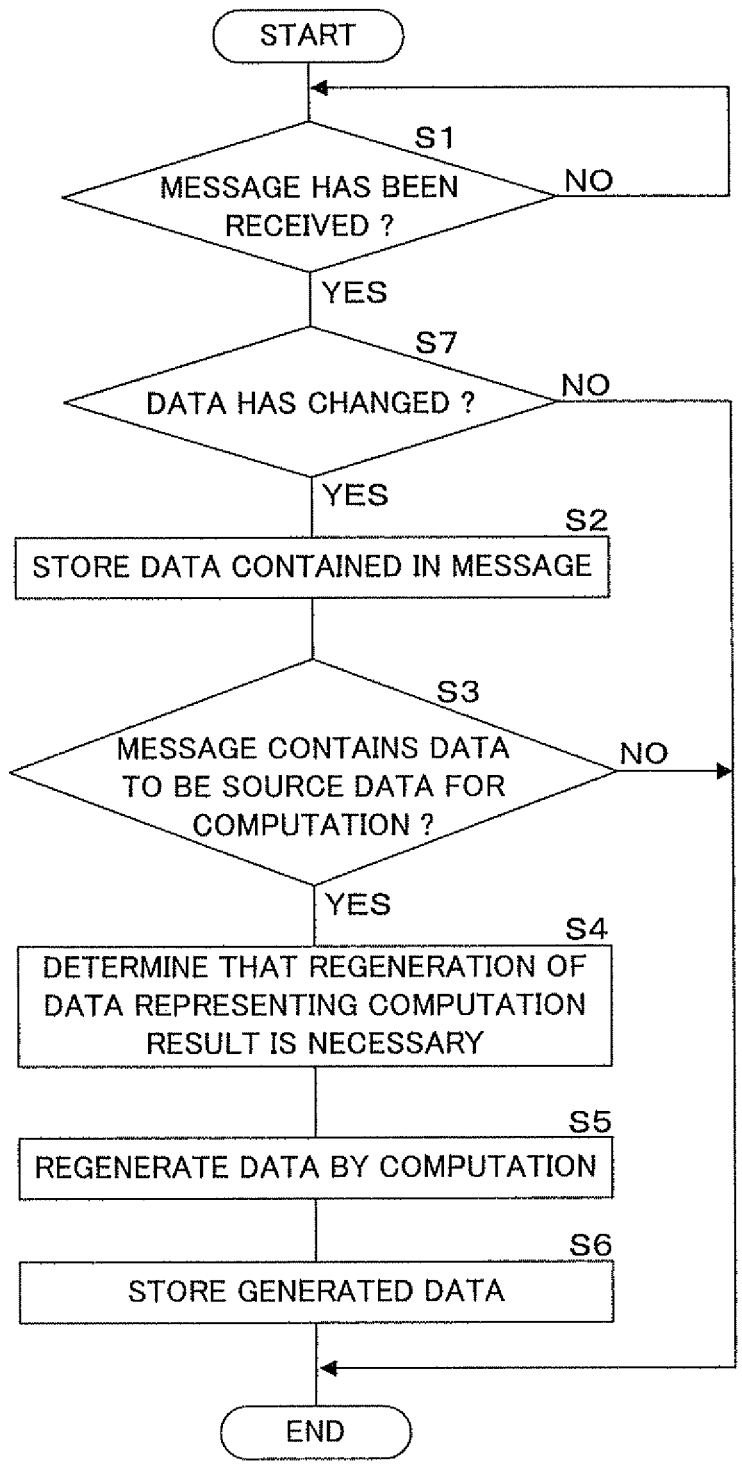
FIG. 4 is a flowchart illustrating one example of the procedure to be followed when a control section of a relay device of Embodiment 2 receives a message.

FIG. 4 is a flowchart illustrating one example of the procedure to be followed when the control section 30 of the relay device 30 of Embodiment 2 receives a message. In the procedure illustrated by the flowchart of FIG. 4, the same steps as in the procedure illustrated by the flowchart of FIG. 2 of Embodiment 1 are designated with the same step numbers, and detailed explanations thereof will be omitted.

When it is determined that a message has been received from the vehicle-mounted devices 1a, 1b, 1c, 1d, 1e, 1f ... (S1: YES), the control section 30 determines whether the numerical information contained in the data of the received message has changed from the numerical information indicated by the data stored in the database DB (step S7). When the control section 30 determines that the numerical information contained in the data of the received message has not changed (S7: NO), it finishes the process.

When the control section 30 determines that the numerical information contained in the data of the received message has changed (S7: YES), it stores the data contained in the message in the database DB (S2). In addition, when it is determined that the message contains data to be the source data for computation (S3: YES), the control section 30 determines that the data representing the computation result is old and regeneration is necessary (S4), and regenerates the data (S5) and stores the generated data obtained by regeneration (S6) and then finishes the process.

The order of performing processing of step S7 and step S2 may be reversed so that data contained in the received message is stored in the database DB for updates regardless of whether or not the numerical information contained in the data has changed, and, only when there is a change in the numerical information contained in the data, the data representing the computation result is regenerated.

The control section 30 of the relay device 3 repeats the procedure illustrated in FIG. 4. With the execution of the procedure illustrated in the flowchart of FIG. 4 by the control section 30 of the relay device 3, the amount of data transferred from the relay device 3 is reduced and the communication load on the communication lines 23 and 24 is reduced compared to the case where data to be the source data for computation is sent to the vehicle-mounted devices 1a, 1b, 1c, 1d, 1e, 1f . . . which require data generated by computation. Moreover, since the vehicle-mounted devices 1a, 1b, 1c, 1d, 1e, 1f . . . which require data generated by computation do not need to perform computation processes, the computational load is reduced. Consequently, it is possible to reduce the sizes of the vehicle-mounted devices 1a, 1b, 1c, 1d, 1e, 1f . . . .

Further, the control section 30 does not perform computation every time the relay device 3 sends data generated by computation to an in-vehicle device which requires the data, but, only when there is a change in the numerical information contained in the data to be the source data for computation, the control section 30 determines that the already stored data is old and regeneration is necessary and performs the operation to calculate the data. Hence, it is possible to allow the control section 30 of the relay device 3 to avoid unnecessary computation processes, and each data stored in the database DB has the latest contents.

(Embodiment 3)

In Embodiments 1 and 2, a determination as to whether it is necessary to regenerate data which is generated by computation using data received from the vehicle-mounted devices 1a, 1b, 1c, 1d, 1e, 1f is made when a message containing data to be the source data for computation is received from the vehicle-mounted devices 1a, 1b, 1c, 1d, 1e, 1f . . . , and data regeneration is performed when it is determined that regeneration is necessary. On the other hand, in Embodiment 3, when the relay device 3 receives a send request for data from the vehicle-mounted devices 1a, 1b, 1c, 1d, 1e, 1f . . . , the process of determining whether or not it is necessary to regenerate the data and the regeneration of the data are performed.

Since the configuration of a vehicle-mounted communication system of Embodiment 3 is the same as that of Embodiment 1 except for the process performed by the control section 30 of the relay device 3, detailed explanations of the respective components will be omitted. The same structures as in Embodiment 1 will be designated with the same reference numerals, and the process performed by the control section 30 of the relay device 3 of Embodiment 3 will be explained in detail below.

Note that the control section 10 of each of the vehicle-mounted devices 1a, 1b, 1c, 1d, 1e, 1f . . . of Embodiment 3 is configured to transmit a send request for required data to the relay device 3. It may also possible to configure the control section 10 to send a command to retrieve the database DB as a data send request from the vehicle-mounted device 1a, 1b, 1c, 1d, 1e, 1f . . . to the relay device 3 through the communication control section 12.

Figure 5:
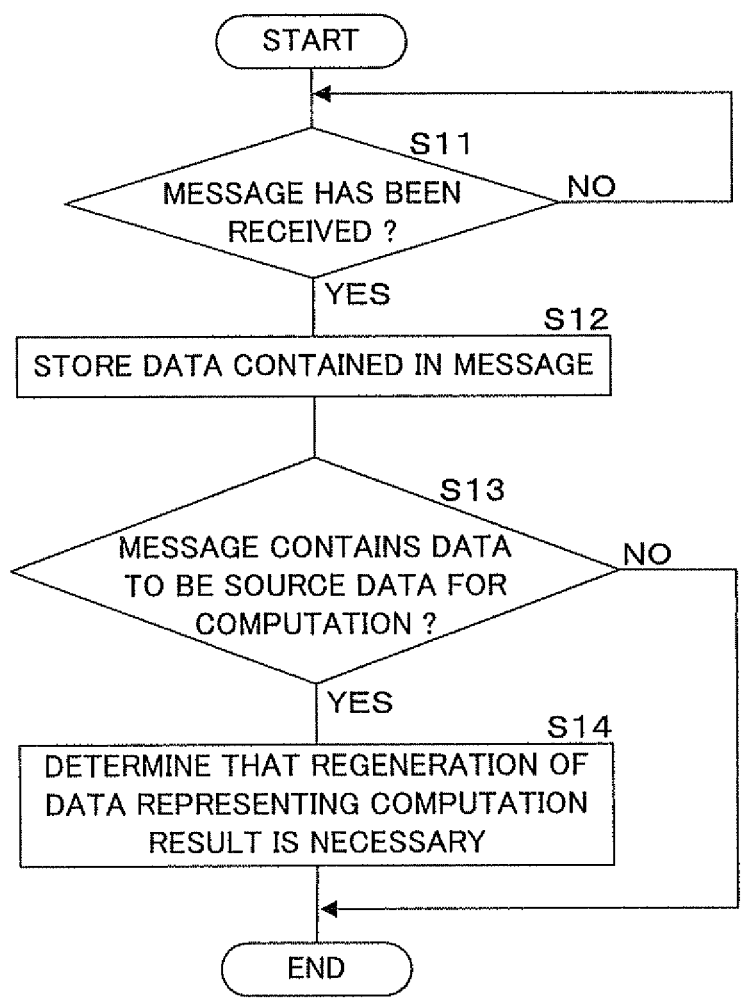
FIG. 5 is a flowchart illustrating one example of the procedure to be followed when a control section of a relay device of Embodiment 3 receives a message.

FIG. 5 is a flowchart illustrating one example of the procedure to be followed when the relay device 3 of Embodiment 3 receives a message.

The control section 30 determines whether a message has been received from any one of the vehicle-mounted devices 1a, 1b, 1c, 1d, 1e, 1f . . . (step S11). When it is determined that a message has not been received from the vehicle-mounted devices 1a, 1b, 1c, 1d, 1e, 1f . . . (S11: NO), the control section 30 returns the process to step S11. When it is determined that a message has been received from the vehicle-mounted devices 1a, 1b, 1c, 1d, 1e, 1f . . . (S11: YES), the control section 30 extracts data contained in the message and stores the data in the database DB of the storage section 35 (step S12).

Next, the control section 30 determines whether the received message contains data to be the source data for computation (step S13). When it is determined that the received message does not contain data to be the source data for computation (S13: NO), the control section 30 finishes the process which is to be performed when a message is received.

When it is determined that the received message contains the source data for computation (S13: YES), the control section 30 determines that the data representing the computation result which was already generated and stored is old and regeneration is necessary, and records information indicating that regeneration is necessary in association with the data representing the computation result (step S14), and finishes the process which is to be performed when a message is received.

The control section 30 of the relay device 3 repeats the procedure illustrated in FIG. 5. Thus, the database DB is appropriately updated, and it becomes possible to make a determination later, with reference to the records, as to whether or not it is necessary to regenerate data which is generated by computation using the data stored in the database DB.

Figure 6:
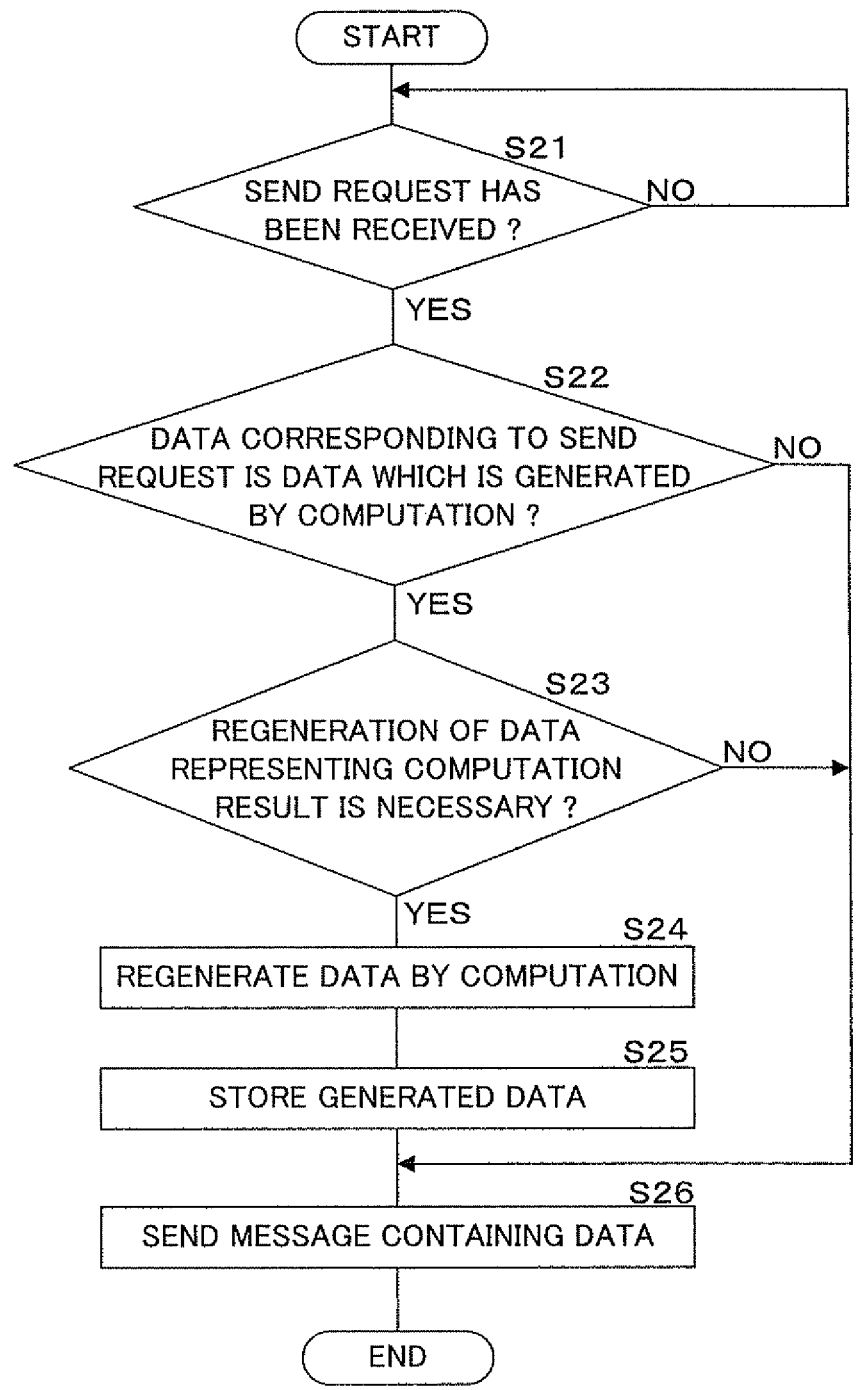
FIG. 6 is a flowchart illustrating one example of the procedure to be followed when the control section of the relay device of Embodiment 3 receives a request to send data.

FIG. 6 is a flowchart illustrating one example of the procedure to be followed when the relay device 3 of Embodiment 3 receives a request to send data.

The control section 30 determines whether or not a send request for data has been received from the vehicle-mounted devices 1a, 1b, 1c, 1d, 1e, 1f . . . (step S21). When it is determined that a send request has not been received from the vehicle-mounted devices 1a, 1b, 1c, 1d, 1e, 1f . . . (S21: NO), the control section 30 returns the process to step S21.

When it is determined that a send request has been received from the vehicle-mounted devices 1a, 1b, 1c, 1d, 1e, 1f . . . (S21: YES), the control section 30 determines whether data corresponding to the received send request is data which is generated by computation using other data item or items (step S22). When it is determined that the data corresponding to the received send request is not data generated by computation using other data item or items (S22: NO), the control section 30 retrieves the data corresponding to the send request from the database DB and sends a message containing the data (step S26) and finishes the process which is to be performed when a send request for data is received.

When it is determined that the data corresponding to the received send request is data generated by computation using other data item or items (S22: YES), the control section 30 determines whether the data representing the computation result is old and regeneration is necessary (step S23). Note that when the control section 30 receives a message containing data, it records information indicating that the data representing the computation result needs to be regenerated. Hence, the control section 30 determines, on the basis of the information recorded together with the data, whether or not regeneration is necessary. When it is determined that the data representing the computation result is new and regeneration is not necessary (S23: NO), the control section 30 retrieves the data which was already stored in the database DB as the computation result, and sends a message containing the data (S26) and finishes the process which is to be performed when a send request for data is received.

When the control section 30 determines that the data representing the computation result is old and regeneration is necessary (S23: YES), it regenerates the data by computation (step S24), stores the generated data obtained by regeneration in the database DB (step S25), sends a message containing the data representing the computation result (S26), and finishes the process which is to be performed when a send request for data is received.

The control section 30 repeats the procedure illustrated in the flowchart of FIG. 6. In the structure where the control section 30 of the relay device 3 executes the procedure illustrated in the flowchart of FIG. 6, a determination as to whether data regeneration is necessary is made only when a send request for data is received. Therefore, the data is regenerated by computation based on the source data for computation at the time either of the vehicle-mounted devices $1a$, $1b$, $1c$, $1d$, $1e$, $1f$ ... requires the data. Thus, the data is not generated by computation based on data contained in a message every time a message containing data is received from the vehicle-mounted devices $1a$, $1b$, $1c$, $1d$, $1e$, $1f$ ..., but the data is generated only when it is required by the vehicle-mounted devices $1a$, $1b$, $1c$, $1d$, $1e$, $1f$ .... Hence, the amount of data to be sent is reduced compared to the case where all the data to be the source data for computation is sent to the respective vehicle devices $1a$, $1b$, $1c$, $1d$, $1e$, $1f$ ... which require data generated by computation. Further, the computation process for regenerating the data is not wasted, and the computational load on the control section 30 of the relay device 3 is reduced.

According to the procedure illustrated by the flowchart of FIG. 5 of Embodiment 3, when a message is received (S11: YES) and the received message contains data to be the source data for computation (S13: YES), information indicating that the data representing the computation result needs to be regenerated is recorded (S14). However, it is not necessary to record the information indicating that regeneration is necessary in every case when a received message contains data to be the source data for computation, and the information indicating that regeneration is necessary may be recorded only when the numerical information contained in the received data has changed from the numerical information on the data received in the past and stored in the database DB. Consequently, wasteful data regeneration is further avoided, and the computational load on the relay device 3 is reduced.

(Embodiment 4)

Figure 7:
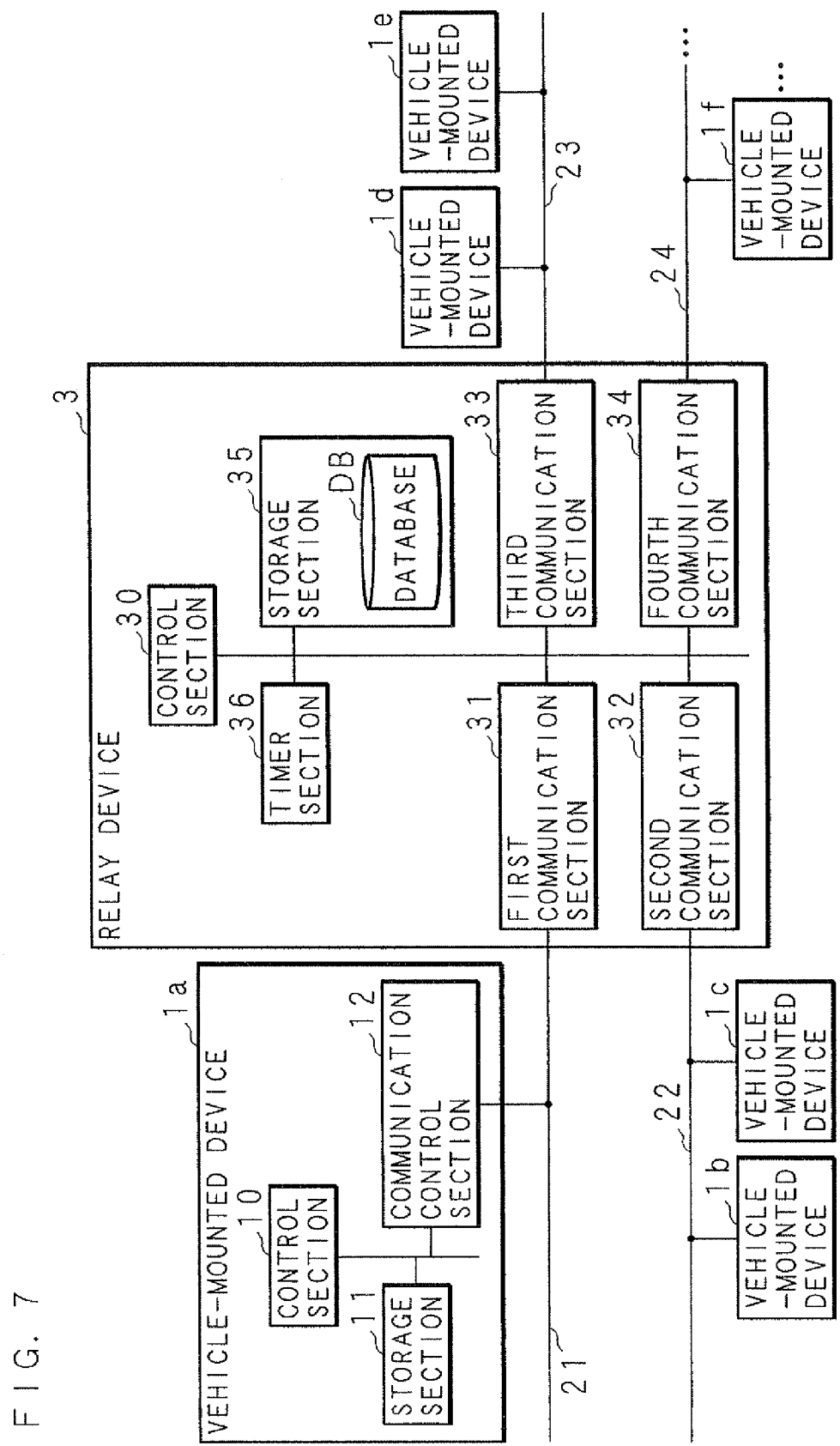
FIG. 7 is a block diagram illustrating the configuration of a vehicle-mounted communication system according to Embodiment 4.

In Embodiment 4, the relay device 3 determines, based on the time information, whether data regeneration is necessary, and makes a determination as to whether regeneration is necessary when it receives a send request. FIG. 7 is a block diagram illustrating the configuration of a vehicle-mounted communication system of Embodiment 4. The configuration of the vehicle-mounted communication system of Embodiment 4 is the same as that of Embodiment 1, except for the details of the internal structure of the relay device 3 and the process performed by the control section 30. Therefore, the same structures in the configuration of the vehicle-mounted communication system illustrated in FIG. 7 are designated with the same reference numerals, and detailed explanations thereof are omitted.

As illustrated in the block diagram of FIG. 7, the relay device 3 of Embodiment 4 comprises a timer section 36 for measuring time by counting at a predetermined frequency. The control section 30 is able to obtain the current time information from the timer section 36. The timer section 36 may have a function of acquiring time information by receiving radio waves from a GPS (Global Positioning System) satellite.

FIG. 8 is a flowchart illustrating one example of the procedure to be followed when the relay device 3 of Embodiment 4 receives a message.

The control section 30 determines whether a message has been received from any one of the vehicle-mounted devices $1a$, $1b$, $1c$, $1d$, $1e$, $1f$ ... (step S31). When it is determined that a message has not been received from the vehicle-mounted devices $1a$, $1b$, $1c$, $1d$, $1e$, $1f$ ... (S31: NO), the control section 30 returns the process to step S31. When it is determined that a message has been received from the vehicle-mounted devices $1a$, $1b$, $1c$, $1d$, $1e$, $1f$ ... (S31: YES), the control section 30 extracts data contained in the message and stores the data in the database DB of the storage section 35 (step S32).

The control section 30 stores the time information indicating the updated time of the database DB obtained from the timer section 36 at the time the message was received or stored in association with the data stored in step S32 (step S33), and finishes the procedure which is to be followed when a message is received.

The control section 30 of the relay device 3 repeats the procedure illustrated in FIG. 8, and stores the data and the time information in the database DB every time the relay device 3 receives a message from the vehicle-mounted devices $1a$, $1b$, $1c$, $1d$, $1e$, $1f$ .... Hence, the database DB is appropriately updated, and a determination as to whether or not regeneration of data stored in the database DB is necessary may be made on the basis of whether the data is old with reference to the time information.

Figure 9:
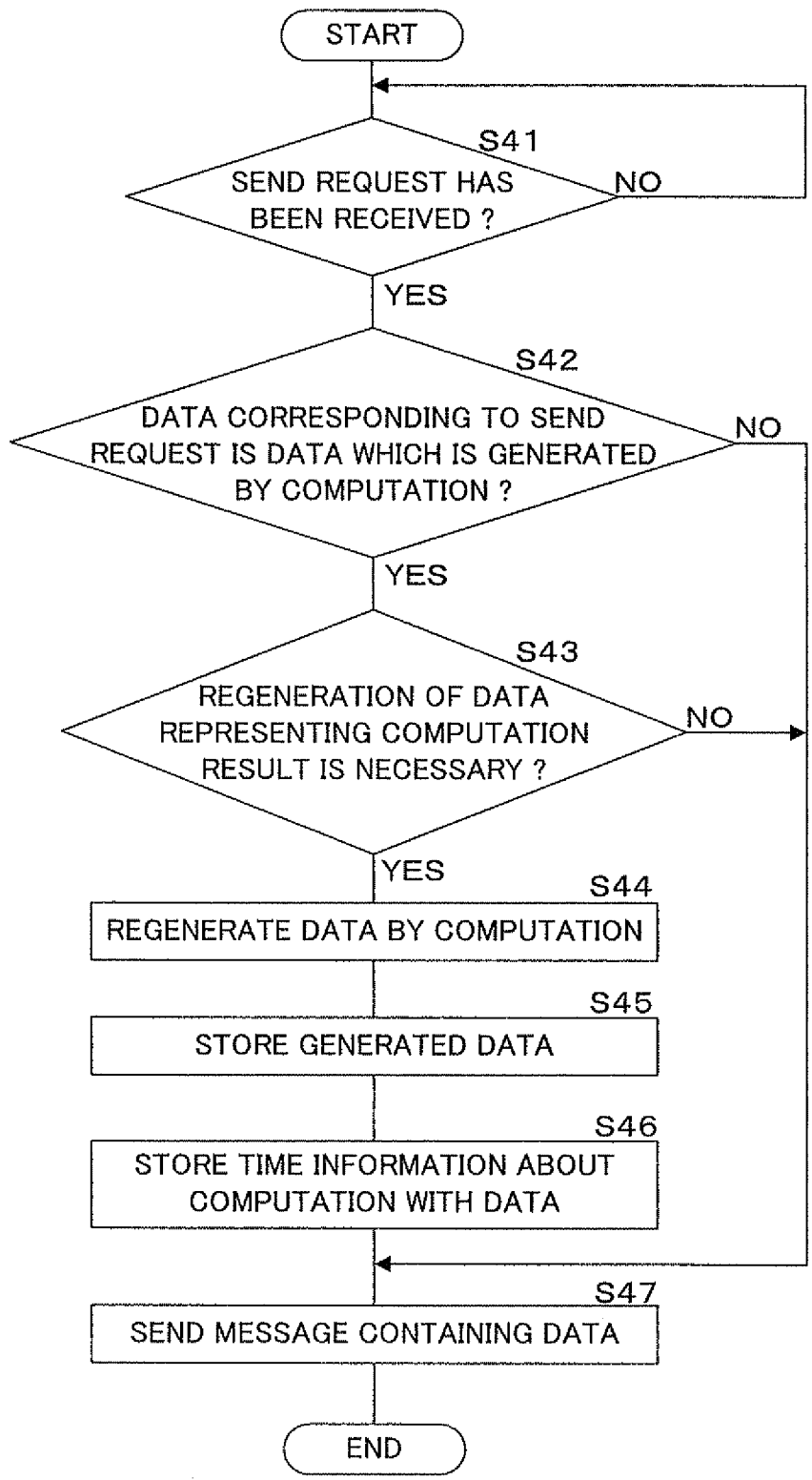
FIG. 9 is a flowchart illustrating one example of the procedure to be followed when the control section of the relay device of Embodiment 4 receives a request to send data.

FIG. 9 is a flowchart illustrating one example of the procedure to be followed when the relay device 3 of Embodiment 4 receives a request to send data.

The control section 30 determines whether or not a send request for data has been received from any one of the vehicle-mounted devices $1a$, $1b$, $1c$, $1d$, $1e$, $1f$ ... (step S41). When it is determined that a send request has not been received from the vehicle-mounted devices $1a$, $1b$, $1c$, $1d$, $1e$, $1f$ ... (S41: NO), the control section 30 returns the process to step S41.

When it is determined that a send request has been received from the vehicle-mounted devices $1a$, $1b$, $1c$, $1d$, $1e$, $1f$ ... (S41: YES), the control section 30 determines whether data corresponding to the received send request is data which is generated by computation using other data item or items (step S42). When the control section 30 determines that data corresponding to the received send request is not data generated by computation using other data item or items (S42: NO), it retrieves the data corresponding to the send request from the database DB and sends a message containing the data (step S47), and finishes the process which is to be performed when a send request for data is received.

When the control section 30 determines that data corresponding to the received send request is data generated by computation using other data item or items (S42: YES), it determines whether the data representing the computation result is old and regeneration is necessary (step S43). Note that if the control section 30 generates data by computation in later-described step S46, it stores the generated data together with the time information at which computation was performed. Hence, in step S43, the control section 30 compares the time information indicating the updated time stored in association with each data item when a message was received with the time information stored when computation was performed. If the time at which computation was performed is earlier than the time at which the data to be the source data for computation was updated, the control section 30 determines that the data representing the computation result is old and regeneration is necessary.

When the control section 30 determines that the data representing the computation result is new and regeneration is not necessary (S43: NO), it retrieves the data already stored as computation result in the database DB and sends a message containing the data (S47), and finishes the procedure which is to be followed when a send request for data is received.

When the control section 30 determines that the data representing the computation result is old and regeneration is necessary (S43: YES), it regenerates the data by computation (step S44) and stores the generated data obtained by regeneration in the database DB (step S45). The control section 30 acquires from the timer section 36 the time information about computation at which data was generated by computation and stores it together with the data representing the computation result in association with each other in the storage section 35 (step S46), sends a message containing the data representing the computation result (S47), and finishes the process which is to be performed when a send request for data is received.

The control section 30 repeats the procedure illustrated in the flowchart of FIG. 9. In the structure where the control section 30 of the relay device 3 executes the procedure illustrated in the flowchart of FIG. 9, data generated by computation using other data item or items is stored together with the time information indicating the time at which the computation was performed. Hence, by comparing it with the time information indicating the updated time of data which is retrieved from a message when the message is received, the control section 30 of the relay device 3 is able to certainly regenerate data which is old. Consequently, the number of times the relay device 3 performs the computation process is reduced, and the data representing the computation result is the latest data.

When a message containing data is received from the vehicle-mounted devices 1a, 1b, 1c, 1d, 1e, 1f . . . and the data is stored in the database DB, and when other data is generated using the data stored in the database DB, the relay device 3 of Embodiment 4 stores the data together with the time information acquired from the timer section 36. As the time information to be stored together with the data, for example, information indicating the age which increases every 100 milliseconds or the life which decreases every 100 milliseconds may be used instead of the time information indicating times, such as the received time, the stored time, and the generated time. When the age is equal to or greater than a predetermined value, or when the life is equal to or less than a predetermined value, the control section 30 of the relay device 3 may determine that the data is old and regeneration is necessary, and regenerate the data.

In Embodiments 1 to 4, when the relay device 3 receives a message containing data from the vehicle-mounted devices 1a, 1b, 1c, 1d, 1e, 1f . . . , it stores the data in the database DB, and determines whether or not it is necessary to regenerate data which is generated using the received data, or stores information indicating that regeneration is necessary or time information and determines at a later stage whether or not regeneration is necessary. A vehicle-mounted communication system may comprise a plurality of relay devices 3 and synchronize the databases DB in the respective relay devices 3, 3 . . . . In this case, the relay device 3 may receive not only data from the vehicle-mounted devices 1a, 1b, 1c, 1d, 1e, 1f . . . , but also data in the database DB from other relay device 3 for synchronization purposes. Even when data is received from other relay device 3, the control section 30 of the relay device 3 determines that it is necessary to regenerate data by using the received data and performs the regeneration process.

In Embodiments 1 to 4, with the use of an FPGA, a microcomputer, or ASIC, the control section 30 of the relay device 3 enables execution of software processes according to conditions, and executes the process of automatically retrieving data from a message when the message is received and storing the data in an address determined for each data attribute by hardware, thereby reducing the processing load and achieving high-speed processing. Note that the control section 30 of the relay device 3 may be configured to control all the operations of the respective components by software.

The disclosed embodiments should be considered to be illustrative and not restrictive in all aspects. Since the scope of the invention is defined by the appended claims rather than by the description preceding them, and all changes that fall within metes and bounds of the claims, or equivalence of such metes and bounds thereof are therefore intended to be embraced by the claims.

The invention claimed is:

1. A relay device being connected to a plurality of external devices through communication lines and relaying repeated sending and receiving of data between the external devices, the relay device being a computer and comprising:
   a communication section for sending and receiving data to and from the external devices;
   a storage section for storing the received data; and
   a controller for:
      generating first additional data by computation based on one or a plurality of items in the received data, the first additional data being different from the received data and being a first computation result;
      storing the first additional data, which is the first computation result, in the storage section;
      determining, based on time information, whether or not regeneration by computation of the first additional data stored in the storage section is necessary;
      regenerating second additional data by computation based on the one or the plurality of items in the received data when it is determined that regeneration is necessary, the second additional data being different from the received data and being a second computation result;
      storing the second additional data, which was obtained by regeneration and which is the second computation result, in the storage section; and
      retrieving the second additional data or the received data from the storage section and causing the communication section to send the retrieved second additional data or the retrieved received data to an external device that requires the second additional data or the received data; wherein
   when the one or the plurality of items is newly received from the external device and contents of the one or the plurality of items have changed from contents of corresponding past data, the controller determines that regeneration of additional data generated using the past data is necessary.

2. The relay device according to claim 1, further comprising a receiving section for receiving a send request for data from the external device, wherein
   when the send request is received, the controller determines whether or not data corresponding to the send request is the additional data, and
   the controller determines whether or not regeneration of the additional data is necessary when it is determined that the data corresponding to the send request is the additional data.

3. The relay device according to claim 1, wherein
   when the controller stores data received from the external device in the storage section and also when the controller generates additional data, the controller stores the time information in the storage section, the time information, the received data and the additional data being stored together, and
   the controller determines, based on the time information, whether or not regeneration of the additional data stored in the storage section is necessary.

4. The relay device according to claim 1, wherein the computer is based on a stored program system or a wired logic system.

5. A communication system, comprising:
a plurality of communication devices for repeatedly sending and receiving data; and
a relay device which is connected to the communication devices through communication lines and relays sending and receiving of data between the communication devices, wherein
the relay device is a computer and comprises:
a communication section for sending and receiving data to and from the communication devices;
a storage section for storing the received data;
a controller for;
generating first additional data by computation based on one or a plurality of items in the data received from the communication devices, the first additional data being different from the received data and being a first computation result; and
storing the first additional data, which is the first computation result, in the storage section; and
a receiving section for receiving a send request for data from the communication devices, and wherein
when data corresponding to the received send request is the first additional data, the controller determines, based on time information, whether or not regeneration by computation of the first additional data is necessary,
the controller regenerates second additional data by computation based on the one or the plurality of items in the received data when it is determined that regeneration is necessary, the second additional data being different from the received data and being a second computation result,
the controller stores the second additional data, which was obtained by regeneration and which is the second computation result, in the storage section, and
the controller retrieves the second additional data or the received data corresponding to the send request from the storage section, and causes the communication section to send the retrieved second additional data or the retrieved received data to the communication device; wherein
when the one or the plurality of items is newly received from a communication device and contents of the one or the plurality of items have changed from contents of corresponding past data, the controller determines that regeneration of additional data generated using the past data is necessary.

6. The communication system according to claim 5, wherein the computer is based on a stored program system or a wired logic system.

7. A communication method for a relay device, which is connected to a plurality of external devices through communication lines and relays sending and receiving of data between the external devices, the method being performed by a computer and comprising:
receiving data repeatedly sent from the external devices;
storing the received data in a storage section;
generating first additional data by computation based on one or a plurality of items in the received data, the first additional data being different from the received data and being a first computation result;
storing the first additional data, which is the first computation result, in the storage section;
determining, based on time information, whether or not regeneration by computation of the first additional data stored in the storage section is necessary;
regenerating second additional data by computation based on the one or the plurality of items in the received data when it is determined that regeneration is necessary, the second additional data being different from the received data and being a second computation result;
storing the second additional data, which was obtained by regeneration and which is the second computation result, in the storage section; and
retrieving the second additional data or the received data from the storage section and sending the retrieved second additional data or the retrieved received data to an external device that requires the second additional data or the received data; wherein
when the one or the plurality of items is newly received from the external device and contents of the one or the plurality of items have changed from contents of corresponding past data, it is determined that regeneration of additional data generated using the past data is necessary.

8. The communication method according to claim 7, wherein the computer is based on a stored program system or a wired logic system.

* * * * *